United States Patent
Moradnia et al.

(10) Patent No.: US 12,258,076 B2
(45) Date of Patent: Mar. 25, 2025

(54) TRANSPARENT SPOILER

(71) Applicant: Honda Motor Co., Ltd., Tokyo (JP)

(72) Inventors: Pirooz Moradnia, Dublin, OH (US); David J. Rose, West Mansfield, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 732 days.

(21) Appl. No.: 17/542,862

(22) Filed: Dec. 6, 2021

(65) Prior Publication Data
US 2023/0174170 A1    Jun. 8, 2023

(51) Int. Cl.
*B62D 35/00* (2006.01)
*B60Q 1/26* (2006.01)
*B60Q 1/34* (2006.01)
*B60Q 1/44* (2006.01)

(52) U.S. Cl.
CPC .......... *B62D 35/007* (2013.01); *B60Q 1/268* (2013.01); *B60Q 1/34* (2013.01); *B60Q 1/44* (2013.01)

(58) Field of Classification Search
CPC ........ B62D 35/007; B60Q 1/268; B60Q 1/34; B60Q 1/44
See application file for complete search history.

(56) References Cited

U.S. PATENT DOCUMENTS

| | | | |
|---|---|---|---|
| 5,074,612 A | | 12/1991 | Liese et al. |
| 5,172,954 A | * | 12/1992 | Yamazaki ............ B62D 35/007 |
| | | | 296/180.1 |
| 5,356,195 A | * | 10/1994 | Kanda .................. B62D 35/007 |
| | | | 296/180.1 |
| 7,052,074 B2 | | 5/2006 | Dringenberg et al. |
| 7,063,375 B2 | | 6/2006 | Dringenberg et al. |
| 8,172,440 B2 | | 5/2012 | Aulakh et al. |
| 9,776,478 B2 | * | 10/2017 | Dryselius ............ G02F 1/13306 |
| 9,821,642 B2 | | 11/2017 | Kato |
| 10,377,429 B2 | * | 8/2019 | Leterrier .............. B62D 35/007 |
| 2019/0202263 A1 | | 7/2019 | Vagni |

FOREIGN PATENT DOCUMENTS

| | | |
|---|---|---|
| DE | 102018206201 A1 | 10/2019 |
| JP | 2018001929 A | 1/2018 |
| WO | 2011007536 A1 | 1/2011 |

OTHER PUBLICATIONS

"Influence of Side Spoilers on the Aerodynamic Properties of a Sports Car," Kurec and Piechna, Energies, 12, 4697, 22 pp, Warsaw University of Technology, Institute of Aeronautics and Applied Mechanics, www.mdpi.com/journal/energies, Dec. 10, 2019.

(Continued)

*Primary Examiner* — Joseph D. Pape
(74) *Attorney, Agent, or Firm* — Plumsea Law Group, LLC (57) ABSTRACT

A transparent spoiler for a vehicle including a first section, at least a portion of the first section having a first visual characteristic, and a second section, at least a portion of the second section having a second visual characteristic, the second visual characteristic defining a greater visibility through the second section than the visibility through the first section.

21 Claims, 9 Drawing Sheets

(56) References Cited

OTHER PUBLICATIONS

C7 Corvette Stingray Z06 style Carbon Fiber Rear Spoiler by APR, General Motors (Chevrolet), [online] [retrieved on Oct. 18, 2021] Retrieved from: https://www.rpidesigns.com/shop/item.aspx?itemid=5138, 2014-2019, 4 pp.

TVR Sagaris: Price. Reviews. Specifications [online] [retrieved on Oct. 18, 2021] Retrieved from: https://www.tc-v.com/specifications/tvr/sagaris/, 3 pp.

* cited by examiner

FIG. 10

TRANSPARENT SPOILER

BACKGROUND

1. Field of the Disclosure

The disclosure herein relates to a rear spoiler for a vehicle and, more particularly, to a rear spoiler having a transparent portion allowing viewing therethrough.

2. Description of Related Art

A rear spoiler is an aerodynamic device disposed on a vehicle in order to reduce the air drag on the vehicle. That is, it redirects the airflow passing over the vehicle body and improves the overall aerodynamics of the vehicle.

By way of example, in order to increase the effectiveness of an upper rear spoiler, conventional practice is to increase the length of the spoiler and angle it downwards as is extends from the roof line of the vehicle above the rear windshield. Even using a solid body color or black color for the spoiler, however, the length and height by which the spoiler can be extended is limited in order to avoid creating negative styling and rear visibility impacts. As such, the most aerodynamic shapes for spoilers are not currently applied because of visibility and styling concerns.

There is thus a need in the art for a system and device to improve the aerodynamic efficiency of a rear spoiler while also mitigating the negative impacts on styling and rear visibility.

SUMMARY

The use of an upper rear spoiler on a vehicle is known to reduce drag and improve the aerodynamics of the vehicle. When the length of the spoiler is increased, however, it may create a less sporty appearance having negative styling and visibility impacts. Even when the spoiler is colored the same as the vehicle body to minimize these impacts, there are still limitations on the length of the spoiler. According to the disclosure herein, an extended portion of the rear spoiler is made from a transparent material rather than the vehicle body color in order to maintain the desired sporty appearance and minimize the loss of styling appeal and rear visibility.

In one aspect, the disclosure provides a transparent spoiler for a vehicle including a first section, at least a portion of the first section having a first visual characteristic, and a second section, at least a portion of the second section having a second visual characteristic, wherein the second visual characteristic defines a greater visibility through the second section than the visibility through the first section.

A further aspect of the disclosure provides a vehicle having a roof panel and a rear windshield disposed downward from the roof panel; at least one lighting element disposed proximal an upper edge of the rear windshield; and a spoiler configured for attachment to the vehicle. The spoiler includes a first section, at least a portion of the first section having a first visual characteristic; and a second section, at least a portion of the second section having a second visual characteristic, the second section further including a pattern formed in a surface thereof. The first section is disposed proximal the roof panel of the vehicle and the second section is disposed rearwards of the first section, the second visual characteristic defines greater visibility through the second section than visibility through the first section, and the at least one lighting element is disposed such that, when illuminated, light from the at least one lighting element is reflected by the pattern in the surface of the second section to define a corresponding visible light pattern that is visible through the second section of the spoiler.

In yet another aspect, the disclosure provides a spoiler for a vehicle having a roof panel and a rear windshield disposed downward from the roof panel, the spoiler including at least a first section having a first visual characteristic and a second section having a second visual characteristic, the first section being disposed proximal the roof panel of the vehicle and the second section extending rearward from the first section. Further, the second section substantially defines a field of view for a driver of the vehicle, the second visual characteristic defines a greater visibility through the second section than a visibility through the first section, and the second section provides a predetermined lighting pattern.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The transparent spoiler according to the disclosure herein provides a vehicle with the intended aesthetic appearance while also reducing drag when the vehicle is moving in forward motion. More particularly, the transparent spoiler according to the disclosure herein includes a first portion having a first visual characteristic and a second portion having a second visual characteristic. The second visual characteristic provides greater visibility through the second portion than through the first portion such as, for example, by being transparent or partially transparent in parts. The transparent spoiler disclosed herein offers additional benefits over an extended spoiler because it allows a cleaner aesthetic appearance and improved rear visibility when the vehicle is being driven in reverse.

Figure 1:
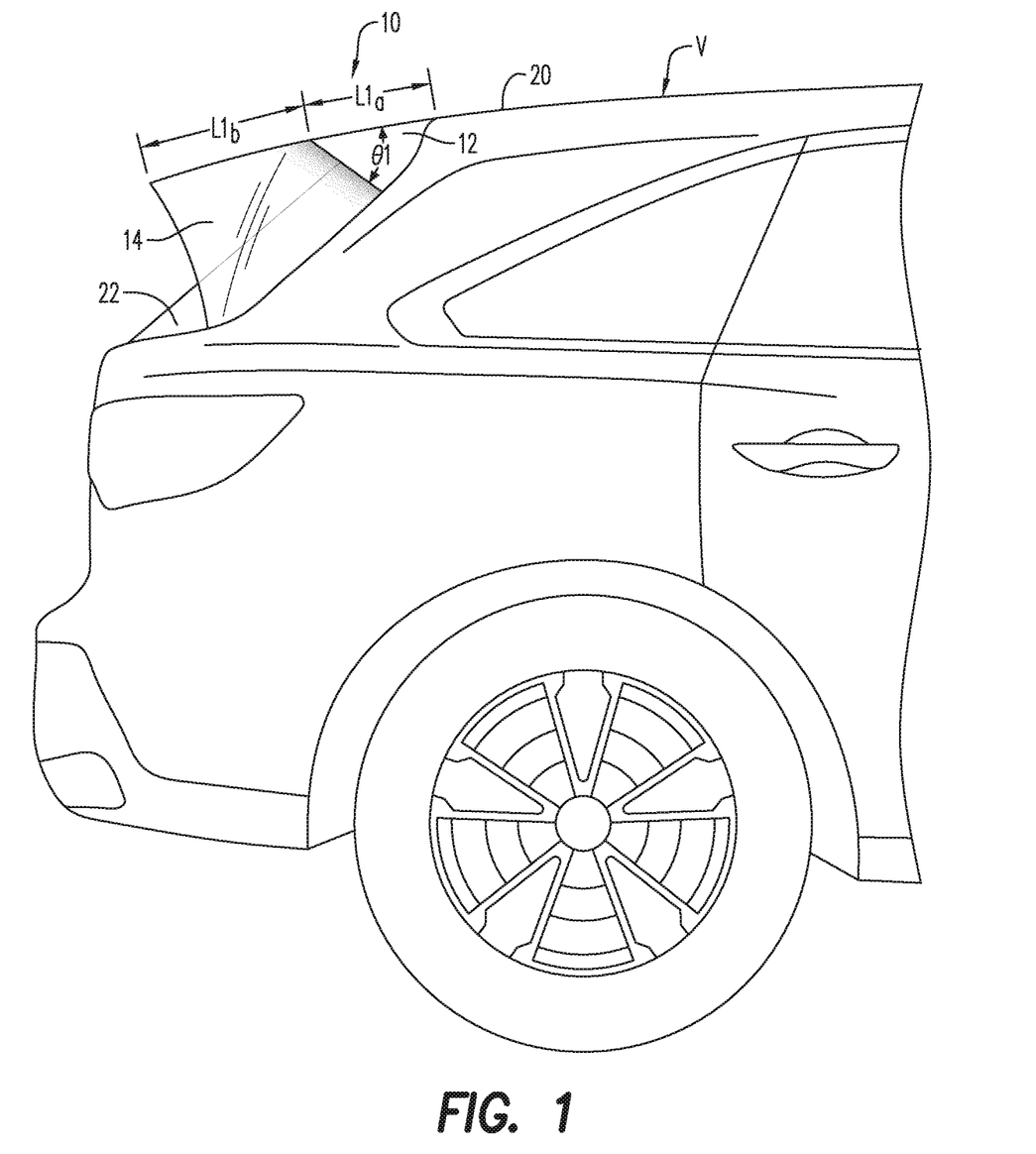
FIG. 1 is a side schematic view of a transparent spoiler according to a first exemplary embodiment of the disclosure.

Referring to FIG. 1, a transparent spoiler according to a first exemplary embodiment of the disclosure is shown generally by reference numeral 10. The spoiler 10 is attached to a vehicle V at a rearward edge of a roof panel 20 above the rear windshield 22. The spoiler 10 includes a first portion 12 proximal the roof panel 20 similar to a conventional spoiler. In addition, however, the spoiler 10 includes a second portion 14 extending outwards from the first portion 12. The first and second spoiler portions 12, 14 each include a center spoiler section and side spoiler sections such that the spoiler 10 extends across the entirety of the rear windshield 22. In the exemplary embodiment, the first portion 12 is formed with a first visual characteristic, such as an opaque material that may be colored to match the body color of the vehicle, or may be black, depending on the desired styling. The second portion 14 is formed with a second visual characteristic, such as a generally transparent material that may be clear or tinted while still allowing at least partial visibility therethrough. As a result, the second portion 14 has a greater visibility therethrough than the first portion 12 of the spoiler 10. Moreover, because the second portion 14 is generally transparent it does not significantly detract from rear visibility or the desired styling appeal of the vehicle V. The transition from the opaque first portion 12 to the generally transparent second portion 14 is illustrated in the first exemplary embodiment as being smoothly blended to gradually diffuse from one portion to the other portion, with at least the trailing edge of second portion 14 being transparent.

Figure 2:
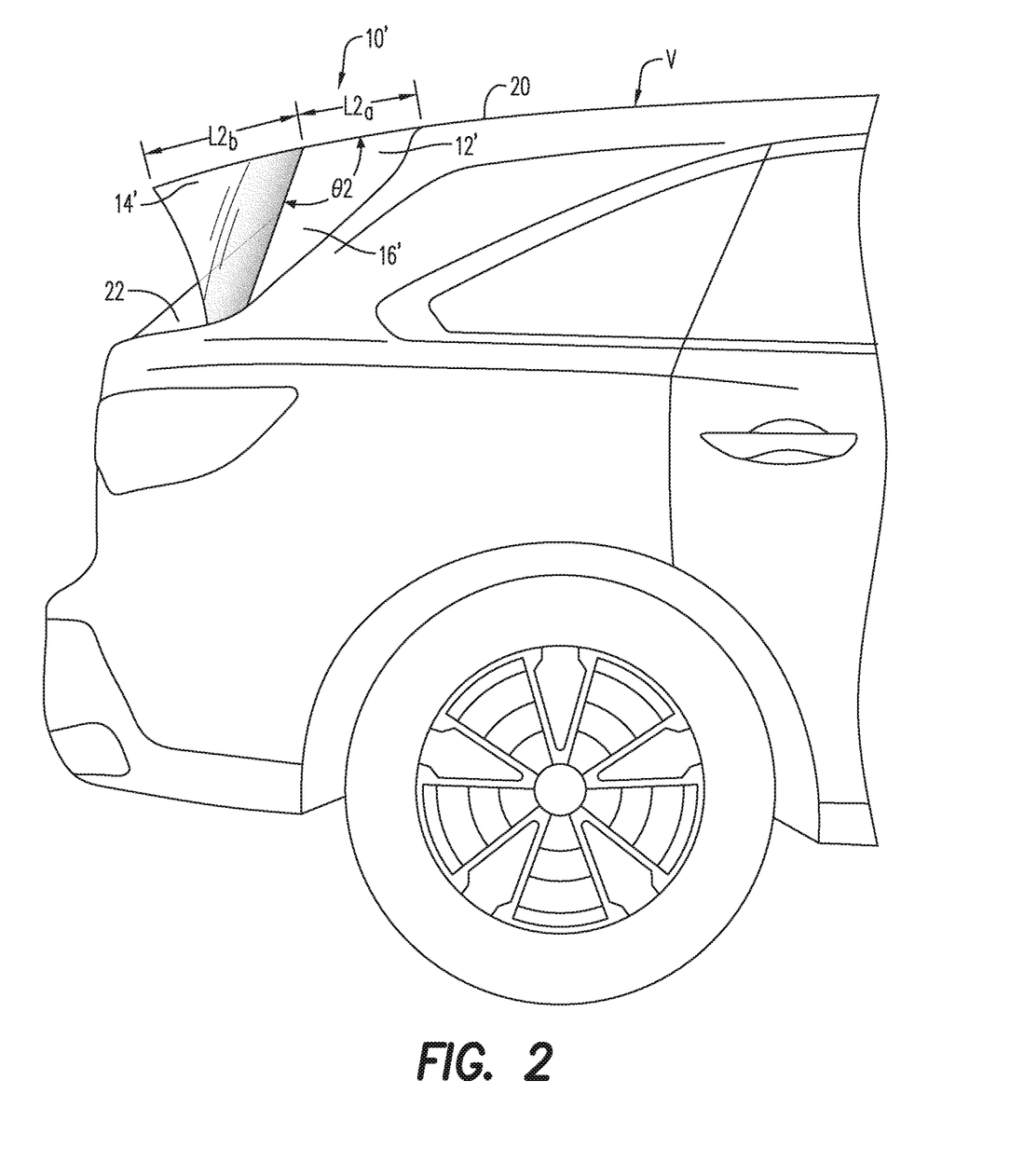
FIG. 2 is a side schematic view of a transparent spoiler according to a modification of the first exemplary embodiment of the disclosure.

FIG. 2 illustrates a modified exemplary embodiment of a spoiler 10' in that the configuration of the first portion 12' is changed by the increased angle of the sides 16' of the first portion 12' relative to the line of the top roof panel 20. More particularly, first portion 12' has an increased angle θ2 and an increased length L2 relative to the embodiment of FIG. 1. In this instance, the opaque portion 12' of the spoiler 10' will have a larger area, but the transparent portion 14' will still extend from the opaque portion 12', with at least the trailing edge of second portion 14' being transparent.

Figure 3:
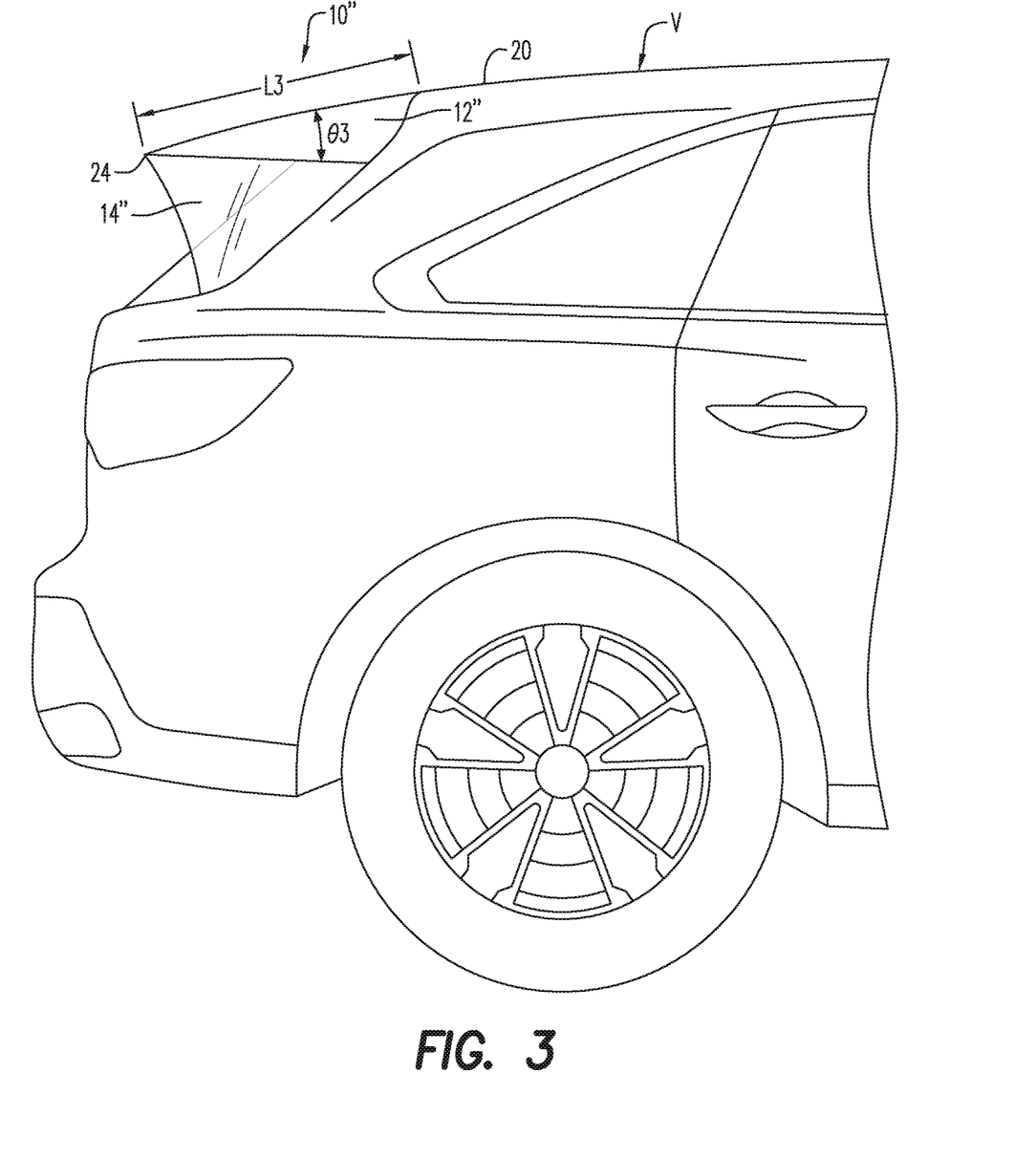
FIG. 3 is a side schematic view of a transparent spoiler according to a further modification of the first exemplary embodiment of the disclosure.

By way of further example, the modified embodiment shown in FIG. 3 includes a first portion 12" extended from where the spoiler 10" meets the roof panel 20 to the terminal end 24 of the spoiler 10". The second portion 14" extends from the first portion 12" and provides the second visual characteristic, i.e., transparency, which assists in minimizing the loss of styling appeal and rear visibility. In addition, the transition from first portion 12" to second portion 14" is illustrated in the modified exemplary embodiment as being a sharp transition from one portion to the other portion. As one skilled in the art will appreciate, a sharp transition or a more gradual transition provide a vast array of styling options that can be used depending upon the desired appearance of the vehicle.

In the exemplary embodiment of FIG. 1, the first portion 12 has a length L1a of approximately 100-200 mm from the roof panel 20 and forms an angle θ1 of approximately 5-70 degrees with a line tangent to a top surface of the spoiler 10. The second portion 14 has a length L1b of approximately 50-400 mm. In the exemplary embodiment of FIG. 2, the first portion 12' has a length L2a of approximately 50-250 mm from the roof panel 20 and forms an angle θ2 of approximately 70-120 degrees with a line tangent to a top surface of the spoiler 10'. The second portion 14' has a length L2b of approximately 50-400 mm. In the exemplary embodiment of FIG. 3, the first portion 12" has a length L3 of approximately 150-500 mm from the roof panel 20 and forms an angle θ3 of approximately 10-60 degrees with a line tangent to a top surface of the spoiler 10". These lengths and angles are merely examples and other lengths and angles can of course be used within the scope of the disclosure here depending upon the styling, aesthetic appearance, and rear visual range desired for the vehicle, further examples of which are described below.

Figure 4:
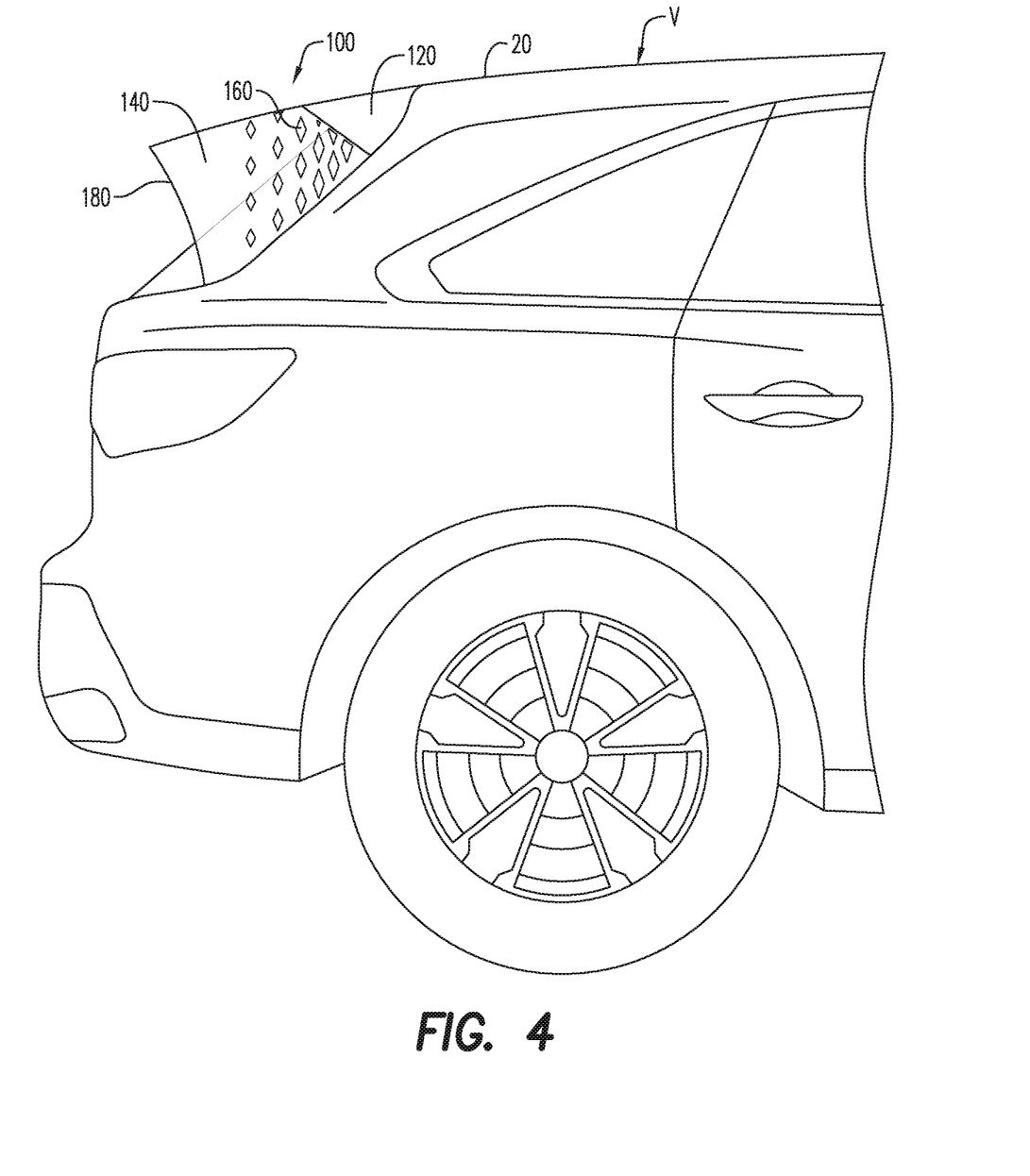
FIG. 4 is a side schematic view of a transparent spoiler according to a second exemplary embodiment of the disclosure.

The transparent spoiler 10, 10', 10" according to the exemplary embodiments disclosed herein are formed from a plastic material such as, by way of example, polycarbonate. Other materials that could also be used include acrylic or laminated glass. The first portion 12, 12', 12" and the second portion 14, 14', 14" are integrally formed from the same material in the exemplary embodiments shown herein, but one skilled in the art will recognize that different materials could also be used A second exemplary embodiment of a transparent spoiler according to the disclosure herein is shown generally by reference number 100 in FIG. 4. Spoiler 100 demonstrates that a gradual or sharp change is color is not the only means to obtain the first and second visual characteristics. That is, a similar effect can be achieved through a repetitive or non-repetitive geometry varying in size and density, which can be body color or black or otherwise colored. Spoiler 100 includes a first portion 120 having a first visual characteristic defined by a generally opaque surface. Spoiler 100 also includes a second portion 140 have a second visual characteristic defined by a plurality of geometric shapes 160. The geometric shapes 160 are larger and more densely arranged closer to the transition from the first portion 120, become smaller and less densely arranged approaching the free edge 180, and are eliminated completely closer to the free edge 180 of the second portion to provide an unobscured visual field through the end of the second portion 140. The quantity, size and location of the various geometric shapes are all variable, however, and may be adjusted depending upon the styling and rear visibility desired for the vehicle. Hence, the shapes and disposition of the geometries 160 shown in FIG. 4 are merely examples and the disclosure is not limited thereto. Similarly, the first portion 120 may comprise a plurality of geometric shapes rather than a solid opaque surface. Still further, the geometric shapes 160 may be configured to represent a logo, slogan, picture, or other decorative feature.

Thus, according to the disclosure herein, the rear upper spoiler transitions from an opaque portion outside of the field of view of the rear window to a clear/transparent portion that extends into the field of view of the rear window, with variations on the location of the opaque or pigmented regions and opaque or pigmented geometries being possible based upon the desire vehicle styling.

Figure 5:
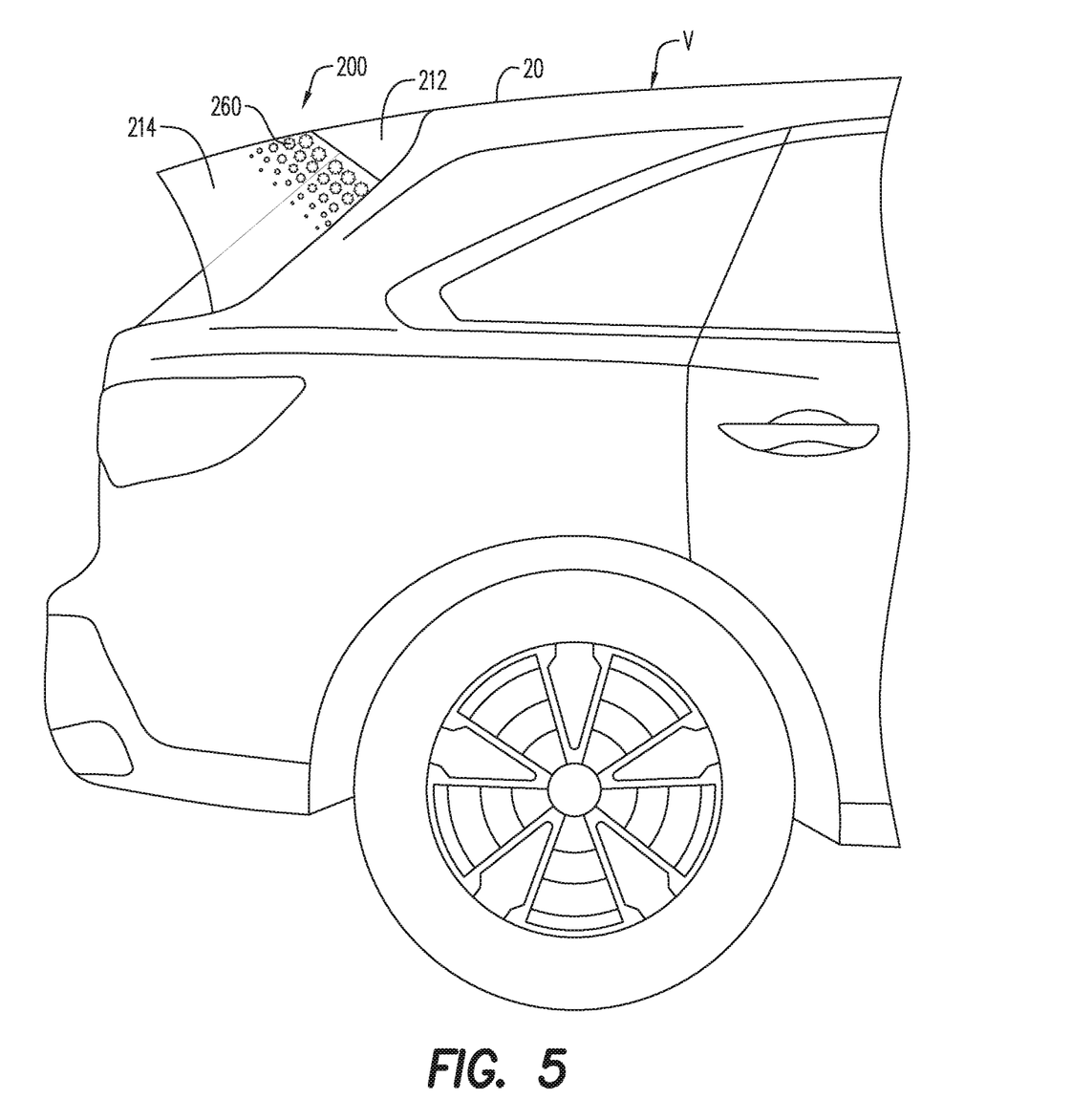
FIG. 5 is a side schematic view of a transparent spoiler including lighting features according to a third exemplary embodiment of the disclosure.

A third exemplary embodiment of the disclosure provides for the addition of lighting to illuminate the transparent spoiler. Referring to FIG. 5, spoiler 200 includes a first portion 212 having a first visual characteristic and a second portion 214 having a second visual characteristic, as discussed above with respect to earlier embodiments. However, transparent spoiler 200 further includes an illuminated pattern 260 provided by lighting elements such as LEDs or the like, as discussed further below. The illuminated shape, density, and/or size of the pattern 260 can be used, for instance, to complement the lighting system of the vehicle, create a styling signature for the vehicle, differentiate between a variety of trim packages on the vehicle or personalized to the specific demands of customer. By way of example, the generally circular elements in the illuminated pattern 260 could be squares, diamonds, or other geometric shapes.

Figure 6:
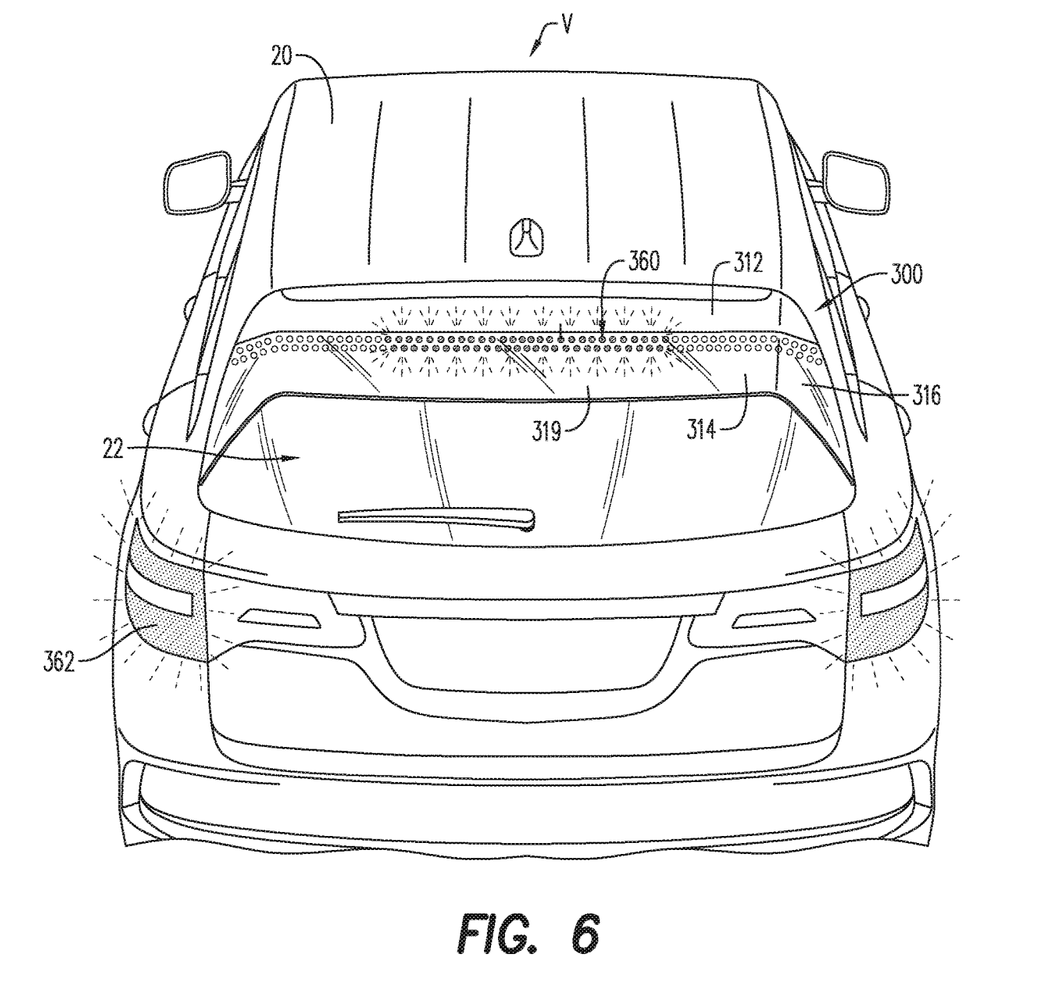
FIG. 6 is a side schematic view of a transparent spoiler including lighting features according to a modification of the third exemplary embodiment of the disclosure.
Figure 7:
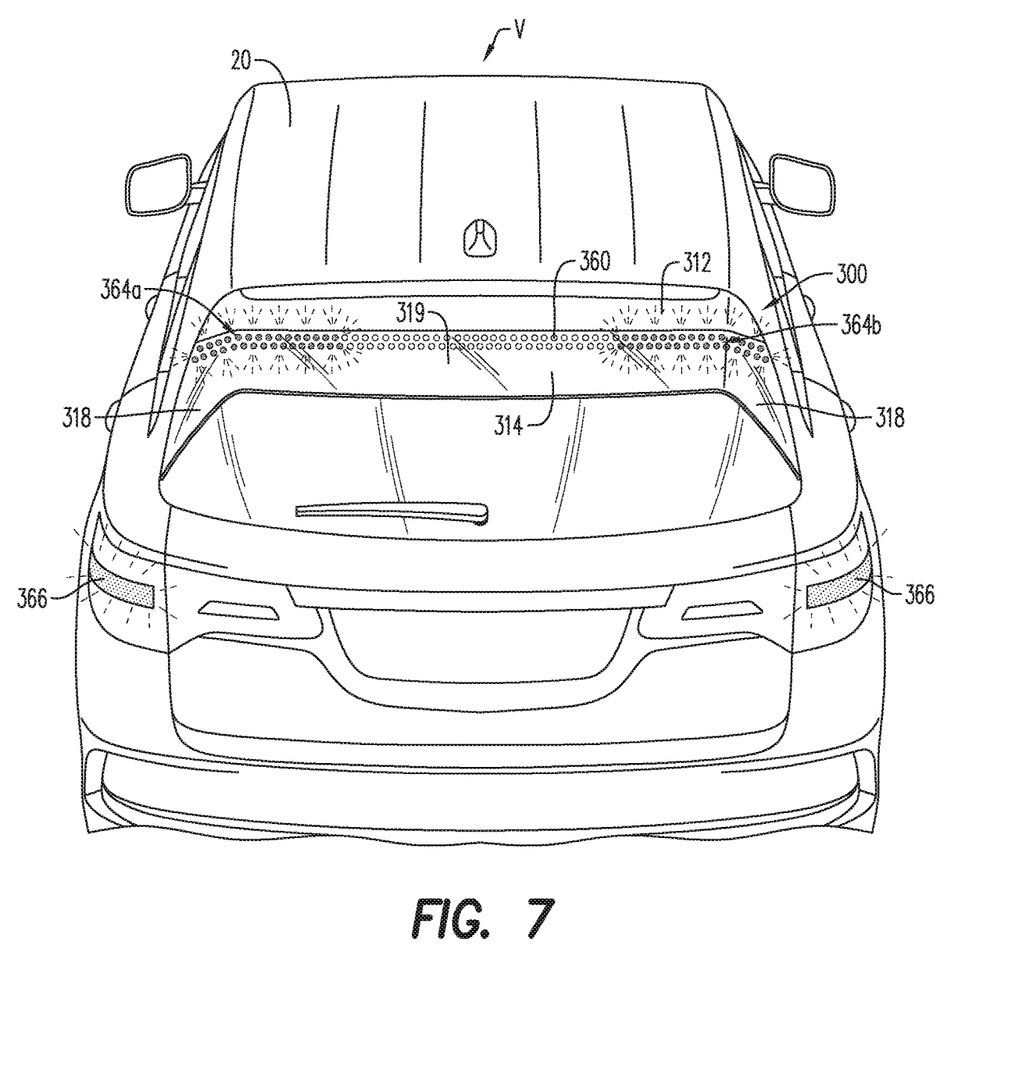
FIG. 7 is a side schematic view of a transparent spoiler including lighting features according to a modification of the third exemplary embodiment of the disclosure.
Figure 8:
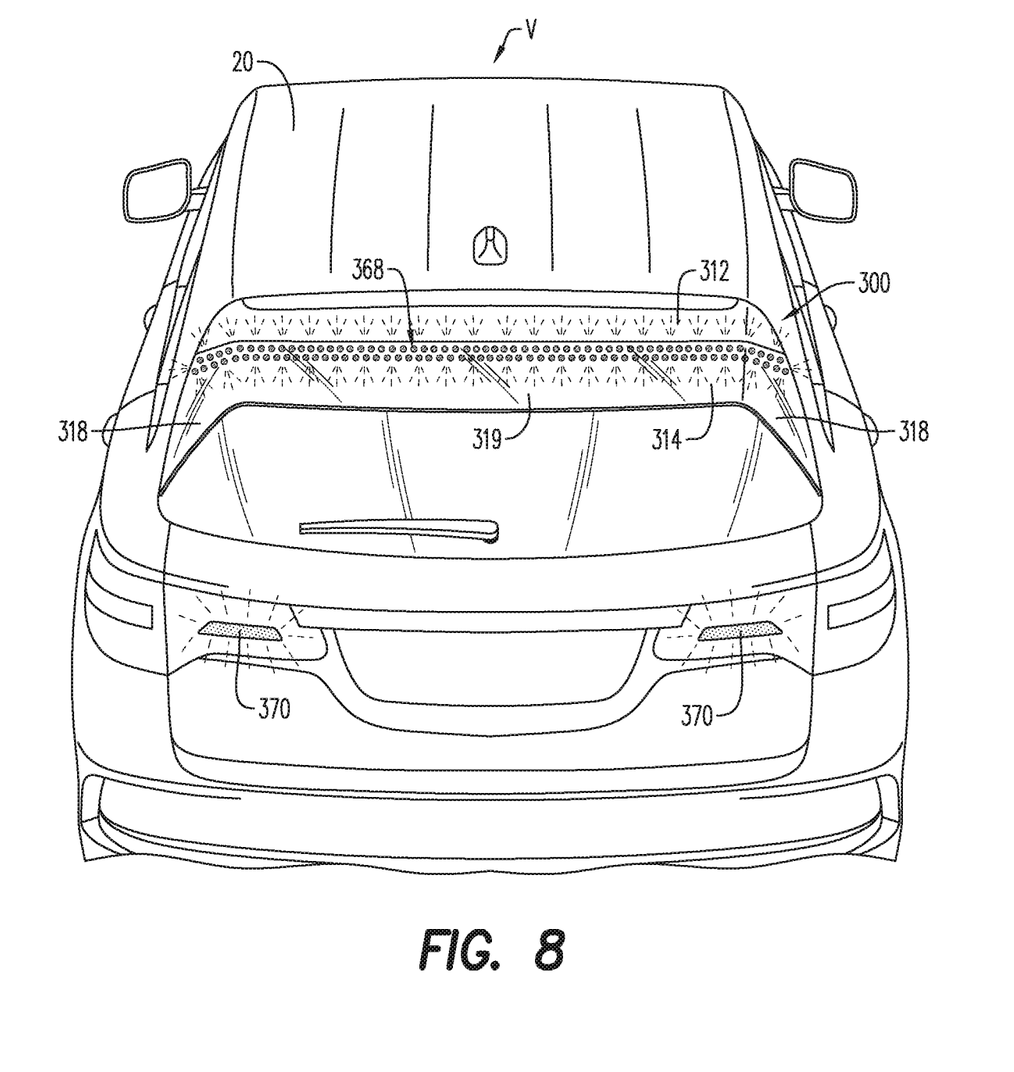
FIG. 8 is a side schematic view of a transparent spoiler including lighting features according to a modification of the third exemplary embodiment of the disclosure.

Referring also to FIGS. 6-8, the transparent spoiler 300 includes a first portion 312 having a first visual characteristic and a second portion 314 having a second visual characteristic, as discussed above with respect to earlier embodiments. In addition, transparent spoiler 300 further includes an illuminated pattern provided by lighting elements such as, fiber optic lights, LEDs or the like, as discussed further below. The illuminated pattern is used to complement the lighting system of the vehicle by providing, by way of example, a third brake light also known as center high mount stop light and/or left and right turn signals. More particularly, the center section 319 of the second portion 314 of spoiler 300 includes a first pattern 360 configured to be illuminated when the brake lights 362 of the vehicle are actuated, as shown in FIG. 6. In this mode of operation, the first pattern 360 is also configured to be illuminated in red in order to correspond to the conventional braking light system on a vehicle. Referring also to FIG. 7, the opposing side sections 318 of the second portion 314 of spoiler 300 includes a second pattern 364a or 364b configured to be illuminated when the right or left turn signal light 366 of the vehicle is actuated, respectively. Although both side patterns 364a and 364b are illustrated as being illuminated simultaneously in FIG. 7, it is understood that generally only one or the other will be illuminated depending upon which turn signal 366 is being actuated. In this mode of operation, the second pattern 364a, 364b is also configured to be illuminated in yellow in order to correspond to the conventional turn signal lighting system on a vehicle, but other colors could of course also be implemented. Further still, with reference to FIG. 8, both the center section 319 and opposing side sections 318 of the second portion 314 are configured to be illuminated in a third pattern of illumination 368 when the reverse lights 370 on the vehicle are actuated. In this configuration, the third pattern of illumination 368 provides illumination extending across a substantial portion of the spoiler 300 including the center section 319 and the opposing side sections 318. The third pattern 368 is also configured to be illuminated in white in order to correspond to the conventional reverse lighting system on a vehicle, but other colors could of course also be implemented.

While FIGS. 6-8 illustrate various illumination patterns that can be provided on the rear spoiler 300, the number of illumination points and the size and shape thereof can of course be varied depending upon the desired styling and rear visibility for the vehicle.

Figure 9:
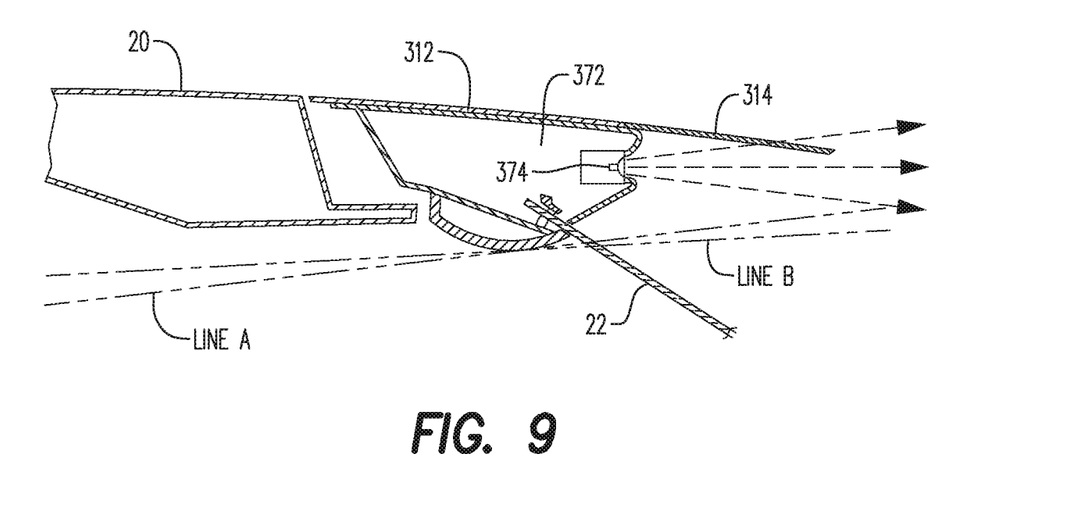
FIG. 9 is a cross section view illustrating a lighting element for the transparent spoiler according to the third exemplary embodiment of the disclosure.

Referring to FIG. 9, a rear brake light assembly 372, such as a center high mounted stop light, is mounted beneath the spoiler and more particularly, it is disposed rearward of at least a portion of the second portion 314' of the spoiler such that light emitted from the light source 374 is visible through a transparent area of second portion 314'. Light source 374 can include fiber optic lighting, LED lighting or other known lighting elements. In this exemplary embodiment, the rear brake light 374 can be seen from behind the vehicle through the second portion 314'' and thus provides increased visibility to another driver or person located behind the vehicle. In addition, the line of sight for the driver along Line A is improved by having a transparent second portion 314' of the spoiler. That is, the rear look up angle when the driver turns to look behind the vehicle through the rear window 22 will be increased by the driver being able to look through the transparent portion 314' of the spoiler. The trailing distance line shown by Line B is also improved, corresponding to what the driver will see when looking into rear view mirror.

Figure 10:
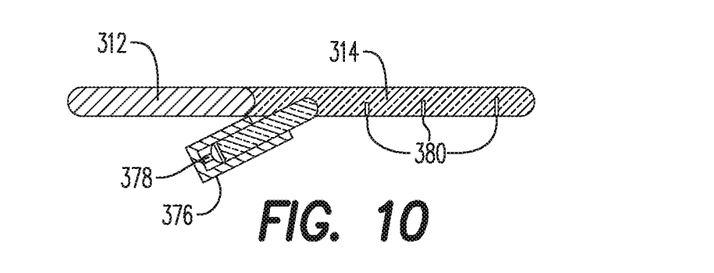
FIG. 10 is a further schematic view of the lighting element for the transparent spoiler shown in FIG. 9.

FIG. 10 illustrates a further exemplary embodiment of the disclosure and the use of lighting in connection with a spoiler having a second portion 314'' with a degree of transparency. In this embodiment, a lighting element 378, such as an LED bulb for example, is disposed within a light holder 376. The underside of the second portion 314'' of the spoiler, that is, the side facing towards the rear window of the vehicle, is provided with etching marks 380 which reflect the light from the lighting element 378. Hence, any desired lighting pattern can be created through the use of reflected light on etched portions 380 of the spoiler portion 314'', such as, by way of example, the braking and turn signal lights discussed above.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A transparent spoiler for a vehicle comprising:
a first section and a second section, the first and second sections each including a center spoiler portion and opposing side spoiler portions extending at a predetermined angle relative to the center spoiler portion;
wherein at least a portion of the center spoiler portion and a portion of the side spoiler portions of the first section have a first visual characteristic;
wherein at least a portion of the center spoiler portion and a portion of the side spoiler portions of the second section have a second visual characteristic; and
wherein the second visual characteristic defines greater visibility through the second section than visibility through the first section.

2. The transparent spoiler according to claim 1, wherein a transition from the first section to the second section is gradually blended.

3. The transparent spoiler according to claim 1, wherein a transition from the first section to the second section is defined by a sharp transition line.

4. The transparent spoiler according to claim 1, wherein the second visual characteristic is defined along at least a trailing edge of the second section.

5. The transparent spoiler according to claim 1, wherein a transition from the first section to the second section is defined by a geometric pattern.

6. A vehicle comprising:
a roof panel and a rear windshield disposed downward from the roof panel;
at least one lighting element disposed proximal one of an upper edge or a side edge of the rear windshield; and
a spoiler configured for attachment to the vehicle, the spoiler comprising:

a first section, at least a portion of the first section having a first visual characteristic; and a second section, at least a portion of the second section having a second visual characteristic, the second section further including a pattern formed in a surface thereof;

wherein the first section is disposed proximal the roof panel of the vehicle and the second section is disposed rearwards of the first section;

wherein the second visual characteristic defines greater visibility through the second section than visibility through the first section; and wherein the at least one lighting element is disposed such that, when illuminated, light from the at least one lighting element is reflected by the pattern in the surface of the second section to define a corresponding visible light pattern that is visible through the second section of the spoiler.

7. The vehicle according to claim 6, wherein the visible light pattern extends in a central region of the second section of the spoiler and is illuminated when a braking system in the vehicle is actuated.

8. The vehicle according to claim 6, wherein the visible light pattern extends along a side region of the second section of the spoiler and is illuminated when a turn signal system in the vehicle is actuated.

9. The vehicle according to claim 6, wherein the visible light pattern extends across substantially an entire width of the second section of the spoiler and is illuminated when a reverse motion of the vehicle is actuated.

10. The vehicle according to claim 6, wherein a transition from the first section to the second section is defined by a geometric pattern.

11. The vehicle according to claim 6, wherein a transition from the first section to the second section is gradually blended.

12. The vehicle according to claim 6, wherein a transition from the first section to the second section is defined by a sharp transition line.

13. The vehicle according to claim 6, wherein the second visual characteristic is defined by a transparent portion along at least a trailing edge of the second section.

14. A spoiler for a vehicle having a roof panel and a rear windshield disposed downward from the roof panel, the spoiler comprising:

at least a first section having a first visual characteristic and a second section having a second visual characteristic;

wherein the first section is disposed proximal the roof panel of the vehicle and the second section extends rearward from the first section;

wherein the second section substantially defines a field of view for a driver of the vehicle, the second visual characteristic defining a greater visibility through the second section than a visibility through the first section; and wherein the second section provides a predetermined lighting pattern.

15. The spoiler according to claim 14, wherein the lighting pattern extends in a central region of the second section of the spoiler and is illuminated when a braking system in the vehicle is actuated.

16. The spoiler according to claim 14, wherein the lighting pattern extends along a side region of the second section of the spoiler and is illuminated when a turn signal system in the vehicle is actuated.

17. The spoiler according to claim 14, wherein the lighting pattern extends across substantially an entire width of the second section of the spoiler and is illuminated when a reverse motion of the vehicle is actuated.

18. The spoiler according to claim 14, wherein a transition from the first section to the second section is gradually blended.

19. The spoiler according to claim 14, further comprising a plurality of embedded light elements corresponding to the predetermined lighting pattern.

20. The spoiler according to claim 14, further comprising at least one lighting element disposed proximal an upper edge of the rear windshield and an etched pattern formed in a surface of the second section of the spoiler corresponding to the predetermined lighting pattern.

21. The transparent spoiler according to claim 1, wherein the transparent spoiler comprises a continuously coplanar spoiler body extending a predetermined distance at a predetermined angle from a roof panel of the vehicle, the spoiler body including the first section defining a first length and the second section defining a second length;

wherein the first and second lengths of the first and second sections, respectively, define the predetermined distance that the spoiler body extends from the roof panel of the vehicle.

* * * * *